May 19, 1936.  R. W. JOHNSON  2,041,416
SOLENOID VALVE
Filed Oct. 3, 1932

INVENTOR.
Roy W. Johnson
BY
ATTORNEYS

Patented May 19, 1936

2,041,416

UNITED STATES PATENT OFFICE 2,041,416

SOLENOID VALVE

Roy W. Johnson, Milwaukee, Wis.

Application October 3, 1932, Serial No. 636,003

4 Claims. (Cl. 137—139)

This invention relates to an improvement in solenoid valves especially designed and adapted for use in controlling the flow of water as, for example, to an air conditioner although also adapted for other uses and applications.

Among the objects of the invention are to provide a valve of this character which may be efficiently and reliably controlled with a small compact solenoid, which is noiseless, which will not leak even after it has been in use over a considerable period of time, the valve effectively resisting the wearing and corroding action of grit or other solids entrained in the liquid and which is, in general, simple and durable in construction, reliable and effective in operation and easy and comparatively inexpensive to manufacture and install.

Figure 1:
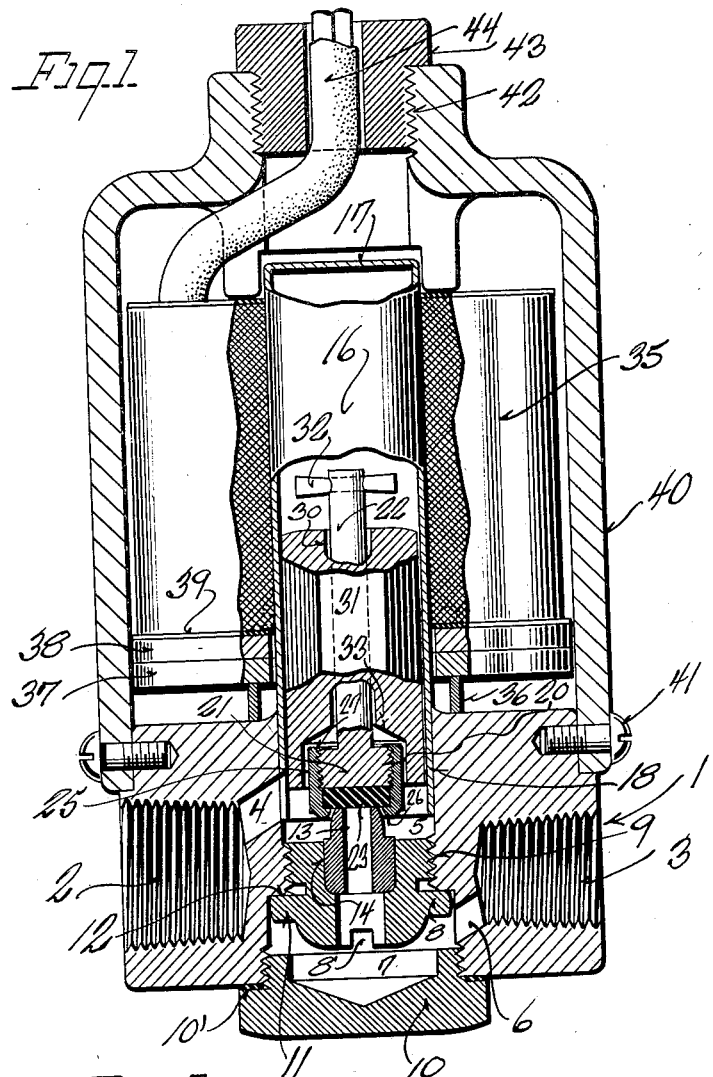
Figure 2:
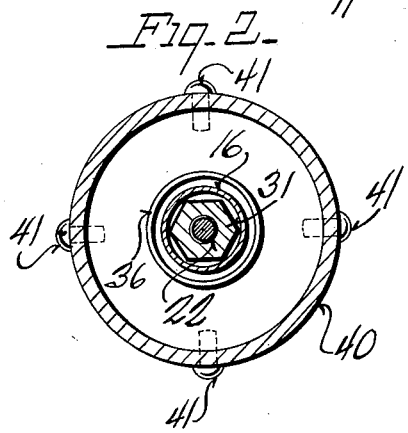

Other objects and advantages reside in certain novel features of the construction, arrangement and combination of parts which will be hereinafter more fully described, and particularly pointed out in the appended claims, reference being had to the accompanying drawing, forming a part of this specification, and in which:

Figure 1 is a view on an enlarged scale showing a valve constructed in accordance with the present invention, the view showing the valve partly in elevation and partly in diametrical vertical section; and Figure 2 is a sectional view taken in the plane of line 2—2 of Figure 1.

Referring to the drawing, the numeral 1 designates a valve casing having a water inlet 2 and a water outlet 3, the water inlet communicating through an opening or passage 4 with a valve chamber 5 and the water outlet 3 communicating through an opening 6 with an outlet chamber 7. Between the valve chamber 5 and the outlet chamber 7 is a ported partition 8 having the form of a bushing threadedly interconnected with the interior of the valve casing as indicated at 9 and cross slotted as at 8' whereby to adapt it for cooperation with a suitable tool to facilitate its assembly and removal. The bushing 8 is also flanged as at 11 and when it is properly assembled the flange 11 abuts against a seat 12 provided therefor within the valve casing. A removable cap 10 is threadedly interconnected with the lower part of the casing to complete the enclosure of the outlet chamber 7 and may be provided with a gasket or washer 10' to insure a fluid tight connection. By removing this cap 10, the bushing 8 is rendered accessible and it may be removed together with the valve seat for purposes of replacement or repair. This also provides for ready access to the valve itself and to the armature of the electromagnet, which parts will be later described. A valve seat in the form of a nipple 13 is set in an enlarged portion 14 formed in the bore or opening of the bushing and is held therein by virtue of its tight fit or in any other suitable way. The opening through this nipple 13 is alined with the opening in the bushing and in fact forms a continuation thereof. The valve chamber 5 is defined in part by the valve casing, bushing 8 and valve seat 13 and is completed by a tube 16, the tube being of cylindrical form and having its upper end closed as at 17. The lower end of the tube is open and the lower end portion 18 is interfitted with the valve casing and brazed, soldered, or otherwise suitably secured thereto. The tube is secured to the casing in such manner as to have fluid tight connection therewith and as to coact therewith in defining the valve chamber.

Within the valve chamber and cooperable with the valve seat 13 is a valve designated generally at 20. The valve 20 comprises a head 21 integral with the lower end of a valve stem 22 and having a flat lower face with which a flat disc 23 flatly engages. The disc 23 is constituted of tough rubber or other tough elastic material and it is held in position by means of a sleeve 25 threaded on the valve head 21 and having an inturned flange 26 at its lower end which overlaps the periphery of the rubber disc 23 and clamps the rubber disc in position against the valve head. If desired, the upper edge of the sleeve 25 may be spun over the valve head slightly to lock the sleeve in position. The stem 22 of the valve extends loosely through the axial opening 30 provided in the core or armature 31 of the solenoid. In the closed position of the valve the upper end of the stem 22 lies above the upper end of the core 31 with the cross pin 32 secured to the upper end of the stem in spaced relation to the upper end of the armature or core 31. This relation between the core or armature and the cross pin 32 may be obtained by making the core shorter than the stem or by recessing the lower end of the core as indicated at 33 in such manner that the recess 33 accommodates a portion of the valve head. The windings of the solenoid or electromagnet are illustrated diagrammatically and are designated at 35. These windings encircle tube 16 and are in operative relation to the armature or core 31. They are supported in position on the valve casing by means of a suitable spacer 36 and flat washers 37, 38 and 39. A casing 40 encloses the windings and has its lower open end overlapping the valve casing and secured thereto as by means of screws 41. The upper end of the casing is closed except for a central opening 42 which receives the bushing 43 through which the wires 44 connected to the terminals of the coil or windings 35 extend.

In use, when current is supplied to the windings 35 the solenoid is energized and the armature or core 31 is pulled upwardly in the tube 16. The upper end of the armature strikes the cross pin 32 with a hammer blow and lifts the valve 20 off the seat 13 thereby allowing fluid or liquid to flow through the valve. When the windings 35 are deenergized the valve 20 and core 31 drop down to the position shown in Figure 1 under the influence of gravity whereby the valve is properly seated. One of the important features of the invention resides in the valve structure and particularly in the manner of combining with the valve structure the flat rubber disc. With this structure the tendency of grit or other solids entrained in the liquid passing through the valve to abrade away the effective portion of the valve is precluded and the valve will remain efficient over a long period of time. More particularly, the rubber disc when combined in the structure as disclosed will not be worn away or have its capacity for coacting with the valve seat 13 to completely close the valve in any way impaired. The valve will not leak even after it has been in use for a long time. Another advantage resides in the fact that the valve is noiseless or practically so. The core 31 when pulled up to open the valve merely strikes the cross pin 32 and when completely pulled up will not engage the tube or other structure. The same advantages are had upon closing of the valve. The valve is not only efficient and durable in these respects but is susceptible of operation with a small or practical sized solenoid.

While I have shown and described one structure as a typical embodiment of the invention, it is to be understood that various changes in the size, shape, form and arrangement of the parts and in the material employed may be had without departing from the spirit of the invention or the scope of the subjoined claims.

The invention claimed is:

1. A solenoid valve comprising a valve casing having an inlet and an outlet and provided with a valve chamber therebetween, a ported partition having a valve seat and disposed in said chamber, the inlet and outlet communicating with the chamber above and below said partition, respectively, a tube having its upper end closed and its lower open end secured and sealed to the wall of the valve chamber above said partition, a valve stem having a head at its lower end provided with a flat lower face, a flat disc of tough elastic material fastened to said face and engageable with the valve seat in the closed position of the valve, a hollow core slidably fitted in said tube and having a longitudinal opening accommodating said stem, said stem projecting beyond the upper end of the core and having an abutment spaced from the upper end of the core in the closed position of the valve, and an electro-magnetic winding coiled about the tube and operatively related to the core and acting when energized to pull said core up along said stem and into impacting engagement with said abutment to open said valve with a snap action, said core, said stem and said abutment being so dimensioned with respect to the tube and so related to the electro-magnetic winding that in the open position of the valve these parts float in the tube to obtain noiseless operation, said core dropping into engagement with said head and aiding in the seating of the valve and in holding the same properly seated when the winding is de-energized.

2. A solenoid valve comprising a valve casing having an inlet and an outlet and provided with a valve chamber therebetween, a ported partition having a valve seat and disposed in said chamber, the inlet and outlet communicating with the chamber above and below the said partition, respectively, a tube having its upper end closed and its lower open end secured and sealed to the casing and communicating with the valve chamber above said partition, a valve stem having a head at its lower end provided with a flat lower face, a flat disc of tough elastic material fastened to said flat disc of tough elastic material fastened to said face and engageable with the valve seat in the closed position of the valve, a hollow core slidably fitted in said tube and having its longitudinal opening accommodating said stem, said stem projecting beyond the upper end of the core and having an abutment spaced from the upper end of the core in the closed position of the valve, and an electro-magnetic winding coiled about the tube and operatively related to the core and acting when energized to pull said core up along said stem and into impacting engagement with said abutment to open said valve with a snap action, said core, said stem and said abutment being so dimensioned with respect to the tube and so related to the electro-magnetic winding that in the open position of the valve these parts float in the tube to obtain noiseless operation, said core dropping into engagement with said head and aiding in the seating of the valve and in holding the same properly seated when the winding is de-energized, the lower end of the core being recessed to accommodate a portion of the valve head in the closed position of the valve.

3. A solenoid valve comprising a valve casing having an inlet and an outlet and provided with a valve chamber therebetween, a ported partition having a valve seat and disposed in said chamber, the inlet and outlet communicating with the chamber above and below said partition, respectively, a tube having its upper end closed and its lower open end secured and sealed to the wall of the valve chamber above said partition, a valve stem having a head at its lower end provided with a flat lower face, a flat disc of tough elastic material engaged with said face, a sleeve threaded to the periphery of the valve head and having an inturned annular flange engaged with the peripheral edge of the lower face of the disc to secure it in position on the valve head for flat surface engagement with the valve seat in the closed position of the valve, a hollow core slidably fitted in said tube and having its longitudinal opening accommodating said stem, said stem projecting beyond the upper end of the core and having an abutment spaced from the upper end of the core in the closed position of the valve, and an electro-magnetic winding coiled about the tube and operatively related to the core and acting when energized to pull said core up along said stem and into impacting engagement with said abutment to open said valve with a snap action, said core, said stem and said abutment being so dimensioned with respect to the tube and so related to the electro-magnetic winding that in the open position of the valve these parts float in the tube to obtain noiseless operation, said core dropping into engagement with said head and aiding in the engagement with said head and aiding in the seating of the valve and in holding the same properly seated when the winding is deenergized.

4. A solenoid valve comprising a valve casing having an inlet and an outlet and provided with a valve chamber therebetween, a ported partition threadedly connected with the wall of the valve chamber and having a valve seat surrounding the port, the inlet and outlet communicating with the chamber above and below said partition, respectively, a tube having its upper end closed and its lower open end secured and sealed to the upper end portion of the wall of the valve chamber, a removable cap threadedly interconnected with the lower end of the wall of the valve chamber, a valve stem having a head at its lower end provided with a flat lower face, a flat disc of tough elastic material fastened to said face and engageable with the valve seat in the closed position of the valve, a hollow core slidably fitted in said tube and having its longitudinal opening accommodating said stem, said stem projecting beyond the upper end of the core and having an abutment spaced from the upper end of the core in the closed position of the valve, and an electro-magnetic winding coiled about the tube and operatively related to the core and acting when energized to pull said core up along said stem and into impacting engagement with said abutment to open said valve with a snap action, said core, said stem and said abutment being so dimensioned with respect to the tube and so related to the electro-magnetic winding that in the open position of the valve these parts float in the tube to obtain noiseless operation, said core dropping into engagement with said head and aiding in the seating of the valve and in holding the same properly seated when the winding is de-energized.

ROY W. JOHNSON.